US010954875B2

United States Patent
Weightman et al.

(10) Patent No.: US 10,954,875 B2
(45) Date of Patent: Mar. 23, 2021

(54) CONTROL OF COMBUSTION ENGINE SHUT DOWN

(71) Applicant: Halliburton Energy Services, Inc., Houston, TX (US)

(72) Inventors: Glenn Howard Weightman, Duncan, OK (US); Timothy Hunter, Duncan, OK (US); Billy Don Coskrey, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 24 days.

(21) Appl. No.: 16/334,492

(22) PCT Filed: Oct. 19, 2016

(86) PCT No.: PCT/US2016/057587
§ 371 (c)(1),
(2) Date: Mar. 19, 2019

(87) PCT Pub. No.: WO2018/075020
PCT Pub. Date: Apr. 26, 2018

(65) Prior Publication Data
US 2019/0211770 A1    Jul. 11, 2019

(51) Int. Cl.
*F02D 41/22* (2006.01)
*F02D 9/10* (2006.01)
(Continued)

(52) U.S. Cl.
CPC ........... *F02D 41/222* (2013.01); *F01D 17/06* (2013.01); *F01D 17/141* (2013.01);
(Continued)

(58) Field of Classification Search
CPC .......... F02D 41/222; F02D 9/101; F02D 9/14; F02D 13/02; F01D 17/141; F01D 17/148;
(Continued)

(56) References Cited

U.S. PATENT DOCUMENTS 4,549,785 A   10/1985 Patrick
7,424,360 B1   9/2008 Munson, Jr.
(Continued)

FOREIGN PATENT DOCUMENTS

WO    2008/013585 A2    1/2008

OTHER PUBLICATIONS

International Search Report and Written Opinion issued in related PCT Application No. PCT/US2016/057587 dated Jul. 11, 2017, 14 pages.

*Primary Examiner* — Joseph J Dallo
(74) *Attorney, Agent, or Firm* — John W. Wustenberg; Baker Botts L.L.P.

(57) ABSTRACT

The abrupt cessation or run-away of a combustion engine may damage the combustion engine and pose a safety hazard to the surrounding environment. The combustion engine operational mode may be controlled, regulated or maintained by regulating the combustion mixture of the combustion engine. The oxidizer flow, a material or both of the combustion mixture may be regulate to create or form a combustion material that is outside a combustible range such that the combustion engine is placed or maintained in a spin-down operational mode. The material added to the combustion mixture may include a combustible, non-combustible, oxidizer, or exhaust material. A brake may also provide a secondary mechanism to maintain or place the combustion engine in a spin-down mode.

20 Claims, 5 Drawing Sheets

(51) Int. Cl.

| | | |
|---|---|---|
| *F02D 9/14* | (2006.01) | |
| *F01D 17/14* | (2006.01) | |
| *F02C 9/20* | (2006.01) | |
| *F01D 17/06* | (2006.01) | |
| *F01D 21/00* | (2006.01) | |
| *F02D 13/02* | (2006.01) | |

(52) U.S. Cl.
CPC ......... *F01D 17/148* (2013.01); *F01D 21/006* (2013.01); *F02C 9/20* (2013.01); *F02D 9/101* (2013.01); *F02D 9/14* (2013.01); *F02D 13/02* (2013.01); *F05D 2270/021* (2013.01); *F05D 2270/083* (2013.01); *F05D 2270/20* (2013.01)

(58) Field of Classification Search
CPC .......... F01D 17/06; F01D 21/006; F02C 9/20; F05D 2270/021; F05D 2270/083; F05D 2270/20
See application file for complete search history.

(56) References Cited

U.S. PATENT DOCUMENTS

| | | | |
|---|---|---|---|
| 2002/0122717 A1 | 9/2002 | Ghetzler et al. | |
| 2005/0283909 A1* | 12/2005 | Mylaraswamy | F01D 21/003 |
| | | | 5/420 |
| 2011/0027061 A1 | 2/2011 | Noack | |
| 2014/0360179 A1* | 12/2014 | Doering | F02M 26/04 |
| | | | 60/602 |
| 2016/0222890 A1* | 8/2016 | Luehrsen | F02M 35/10386 |
| 2016/0231190 A1* | 8/2016 | Bizub | F02D 35/027 |
| 2016/0326965 A1* | 11/2016 | Pereti | F01D 11/24 |

* cited by examiner

CONTROL OF COMBUSTION ENGINE SHUT DOWN

CROSS-REFERENCE TO RELATED APPLICATION

The present application is a U.S. National Stage Application of International Application No. PCT/US2016/057587 filed Oct. 19, 2016, which is incorporated herein by reference in its entirety for all purposes.

TECHNICAL FIELD

The present disclosure relates generally to controlling combustion engines, and more particularly, to a system and method for controlling a combustion engine during an abnormal, adverse or undesirable operation mode.

BACKGROUND

Several types of operations may require use of a certain types of equipment. For example, equipment, such as a combustion engine, on location is used to deliver large quantities of fluid/proppant mixtures to a wellhead at high pressures to perform the desired fracturing operations. Such equipment may operate efficiently, effectively or both for given power and load requirements. However, in certain instances, for example, when a load is removed or a combustion mixture does not comprise a suitable ratio of materials, such equipment may experience or be placed in an abnormal, adverse or undesirable operation mode that may cause damage to the equipment. For example, a combustion engine may experience a run-away mode or an emergency stop mode (for example, an abrupt halting of operations) of the combustion engine causing damage the combustion engine. Avoiding or controlling operation during such abnormal or adverse modes may extend the life of the combustion engine and provide for time and cost savings of a given operation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Certain embodiments according to the present disclosure may be directed to systems and methods for controlled shut-off of a combustion engine. Certain engines use fuel and oxidizer (for an oxygen source) for combustion without using a spark to ignite the combustion mixture, for example, a diesel reciprocating engine and a turbine engine that is either gas or liquid fueled. Turbine engines use a spark for ignition on start-up but operate without a spark after a nominal auto-ignition speed has been reached. Such combustion engines may be shut-off after start-up by removing or altering the combustion mixture. Control of the shut-off of these combustion engines is important to prevent damage to the combustion engine, such as during a run-away condition, and to prevent potentially unsafe conditions or operation of the engine. For example, abrupt shut-off of a combustion engine may damage components of the engine or cause increase wear and tear. Also, abnormal or adverse conditions may arise where normal shut-off is not available. For example, abnormal or adverse conditions may include, but are not limited to, release of natural gas into the atmosphere or other fuel source mixing with the combustion mixture and abrupt removal of a load coupled to the combustion engine. One or more embodiments of the present disclosure control the combustion mixture to the combustion engine to effectively, efficiently, and safely maintain operation of the combustion engine.

Figure 1:
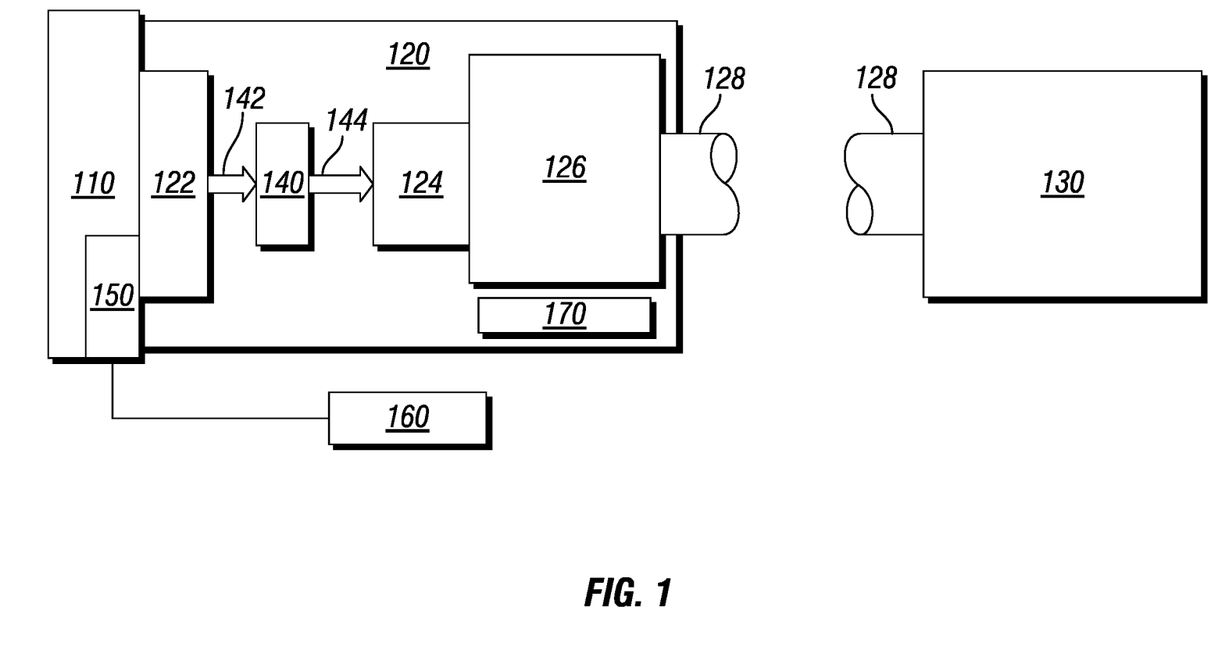
FIG. 1 is a schematic block diagram of a control damper to control a combustion mixture of a combustion engine system, in accordance with one or more aspects of the present disclosure.

Turning now to the drawings, FIG. 1 is a block diagram of a control damper to control a combustion mixture of a combustion engine system according to one or more aspects of the present disclosure. Due to an abnormal or adverse condition, other circumstance or requirement, a combustion engine 120 may be set to one or more operational modes in a controlled manner so as not to damage, cause wear and tear, or otherwise harm the combustion engine 120 or the surrounding environment. A combustion engine 120 may comprise a compression-ignited engine fueled by a gas or a liquid, for example, a diesel reciprocating engine, a turbine engine fueled by a gas or a liquid, or any other combustion engine. The one or more operational modes may include, but are not limited to, shut-off (for example, the combustion engine 120 stops) or a threshold value of operation (for example, a predetermined rotations-per-minute (RPM) of shaft 128).

The combustion engine 120 may comprise an intake vent 122, a combustion chamber 124, an exhaust vent 126, a shaft 128 and a brake 170. The shaft 128 may couple to a load 130, for example, one or more pieces of equipment at a site. Oxidizer (for example, air or oxygen) is received by combustion engine 128 and mixed with a fuel to form the combustion mixture 140. The combustion mixture 140 may comprise a fuel mixed with oxidizer to form a combustible fuel and is conveyed or transmitted to the combustion chamber 124 via a combustion mixture flow path 144. Exhaust is expelled from the combustion chamber 124 via exhaust vent 126. The combustion engine 120 may drive, spin or rotate a shaft 128 to drive a load 130.

In one or more embodiments, a control damper 110 (for example, an air control damper, rotating guillotine or knife type, sliding guillotine, butterfly type valve, iris type valve, swing gate (similar to a guillotine that has a pivot point parallel to the air path but the damper pivot point of rotation is perpendicular to the air path), spring loaded velocity damper, louver type, rotating vane, or expanding bladder) is coupled to or disposed about the intake vent 122 of combustion engine 120. The control damper 110 may control oxidizer flow into the intake vent 122. For example, if the oxidizer disposed about the combustion engine 120 has a concentration of combustible particles (for example, a combustible gas), the control damper 110 may be placed in a closed or partially closed position from an open or partially opened position. Control damper 110 may be moved, disposed or placed in position between an open position and a closed position according to one or more requirements or conditions. The control damper 110 may be manually or automatically controlled. In one or more embodiments, a sensor 150 is disposed about, at or near the intake vent 122 or the control damper 110. The sensor 150 may be directly, indirectly, wirelessly or via a wired connection communicatively coupled to control panel 160. The sensor 150 may transmit information or one or more measurements related to one or more characteristics of the surrounding environment or the oxidizer received by the combustion engine 120 to a control panel 160. The one or more characteristics may comprise any one or more of type of gas, amount of gas, or any other characteristic related to the surrounding environment or the oxidizer received by the combustion engine 120. Control panel 160 may comprise any one or more of a gauge, display, indicator, information handling system (for example, a computing device), or any other device that conveys the information measured by the sensor 150.

In one or more embodiments, the control damper 110 controls the ambient oxidizer flow to the intake vent 122 so as to adjust the oxidizer flow, for example, via oxidizer flow path 142, to create the required oxidizer to fuel ratio for the combustion mixture 140. For example, natural gas has a combustible range of about 4% to 14% of air to fuel, by volume. If the combustion mixture 140 is artificially driven outside this range or a predetermined range, combustion of the combustion engine 120 will cease or stop. However, to prevent damage, undesirable or excessive wear and tear on one or more components of the combustion engine 120 control damper 110 may positioned to allow for an increase in oxidizer flow such that the combustion mixture 140 comprises a concentration of oxidizer that is outside a threshold value or range which ensures that the combustion of the combustion engine 120 will cease, stop or return to a predetermined operational condition.

In one or more embodiments, control damper 110 is spring loaded (not shown) such that when a force is applied the control damper 110 is positioned in or transitioned from a closed or partially closed position from an open or partially opened position. In one or more embodiments, one or more positions of control damper 110 may be controlled or a force may be applied by an actuator (not shown). Control damper 110 may comprise any type of valve, shutter, louver, covering, or device that controls flow of oxidizer. For example, control damper 110 may be a lid that covers an inlet vent (not shown) like a lid to completely or partially cease oxidizer flow to the combustion chamber 124. In one or more embodiments, control damper 110 restricts oxidizer flow to the combustion chamber 124 but permits enough oxidizer flow to maintain one or more operational conditions, such as, cooling. In one or more embodiments, control damper 110 is positioned or disposed within or about the combustion engine 120 to restrict oxidizer flow to one or more sections or portions of the combustion engine 120. In one or more embodiments, control damper 110 is positioned such that oxidizer flow is restricted or ceased for a predetermined length of time or until a threshold condition is reached. For example, a threshold condition may comprise an RPM value, a temperature value, spin-down below auto-ignition speed, or any other condition or combination thereof. In one or more embodiments, control damper 110 comprises an aperture or one or more openings (not shown) disposed about the control damper 110 to allow a portion or measured amount of received oxidizer to flow through to the combustion engine 120 so as to not completely stifle or cause the combustion engine 120 to abruptly cease or stop operation.

In one or more embodiments, control damper 110 may be positioned to restrict oxidizer flow to the combustion chamber 124 such that the combustion mixture 140 is not sufficient to maintain combustion to cause the combustion engine 120 to begin spin-down or the shaft 128 to cease spinning. Control damper 110 may be positioned prior to complete spin-down or prior to reaching a threshold (for example, spin-down below auto-ignition speed) to permit oxidizer flow to the combustion chamber 124 such that the combustion mixture 140 is sufficiently combustible. A brake 170 may be disposed within or about the combustion engine 120 to slow or stop the combustion engine 120 when power generation stops due to the cessation of oxidizer flow by control damper 110 or the introduction of material 320 (as discussed with respect to FIG. 2). The brake 170 slows the combustion engine 120 to an operational condition where momentum in the combustion engine 120 is insufficient to support auto-ignition. For example, the auto-ignition speed of a diesel reciprocating engine may be approximately 100 RPM and 10,000 RPM for a turbine engine. In one or more embodiments, control panel 160 may indicate that a spin-down cycle has been initiated or that the combustion engine 120 has been placed in a spin-down operational mode or any other specified condition. The brake 170 may prevent the combustion engine 120 from spinning back up or transitioning to a spin-up operational mode. The brake 170 may be manually (for example, by an operator) or automatically (for example, by control panel 160 or any other information handling system) engaged to prevent the combustion engine 120 from returning to an operational mode that permits that the shaft to spin. The brake 170 may act as a secondary mechanism to prevent a return to an undesirable or unwanted operational mode of the combustion engine 120.

Figure 2A:
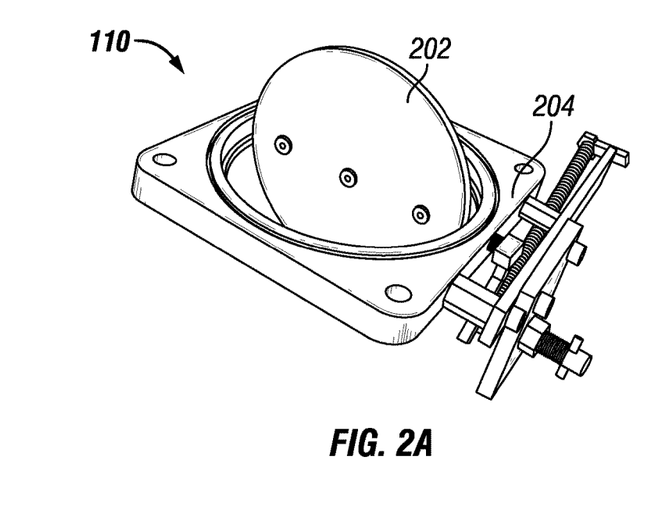
FIG. 2A is a diagram illustrating a control damper to control a combustion mixture for a combustion engine system, in accordance with one or more aspects of the present disclosure.

As illustrated in FIG. 2A, control damper 110 may comprise a butterfly-type valve 202 that rotates or moves about a hinge 204. Hinge 204, may comprise a bolt, screw, rod, or any other device that allows the butterfly-type valve 202 to move between open and closed positions. In one or more embodiments, the butterfly-type valve 202 may be positioned in a closed position such that oxidizer flow is ceased. In one or more embodiments, the butterfly-type valve 202 may be positioned at any position between a closed position and an open position such that a portion of oxidizer flow is restricted.

Figure 2B:
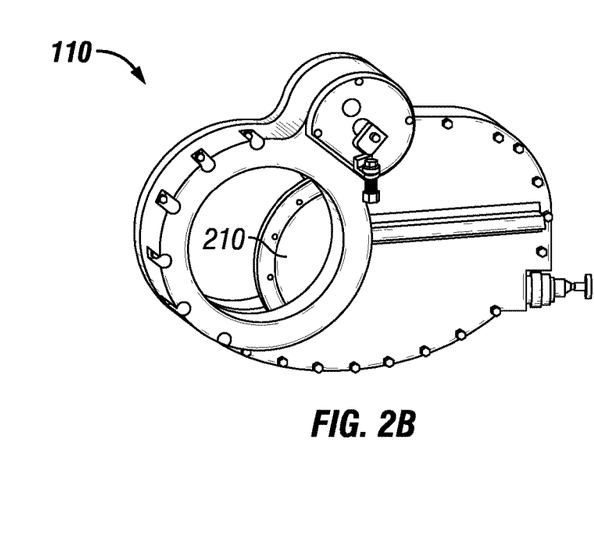
FIG. 2B is a diagram illustrating a control damper to control a combustion mixture for a combustion engine system, in accordance with one or more aspects of the present disclosure.

As illustrated in FIG. 2B, control damper 110 may comprise a gate or knife-type valve 210 that fits in a groove (not shown) of the control damper 110 to swing between open and closed positions. In one or more embodiments, knife-type valve 210 may be positioned in a closed position such that oxidizer flow is ceased. In one or more embodiments, the knife-type valve 210 may be positioned at any position between a closed position and an open position such that a portion of oxidizer flow is restricted.

Figure 2C:
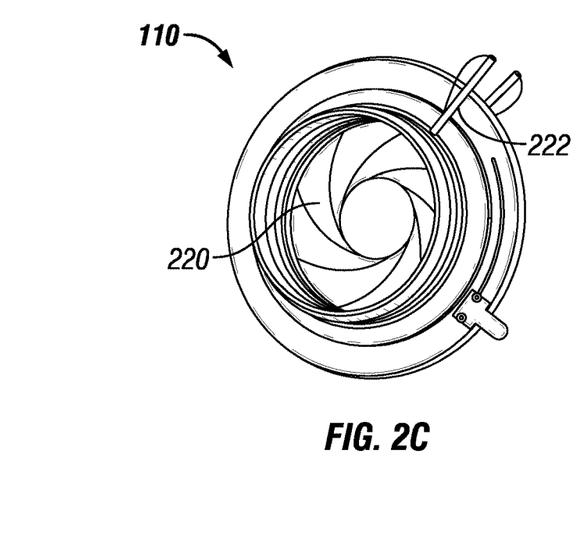
FIG. 2C is a diagram illustrating a control damper to control a combustion mixture for a combustion engine system, in accordance with one or more aspects of the present disclosure.

As illustrated in FIG. 2C, control damper 110 may comprise an iris-type valve 220 to open and close an aperture (not shown) similar to a camera shutter. A locking handle 222 may hold or maintain a position of the iris-type valve 220. In one or more embodiments, iris-type valve 220 may be positioned in a closed positioned such that oxidizer flow is ceased. In one or more embodiments, the iris-type valve 220 may be positioned in any position between a closed position and an open position such that a portion or amount of oxidizer flow is restricted.

Figure 3:
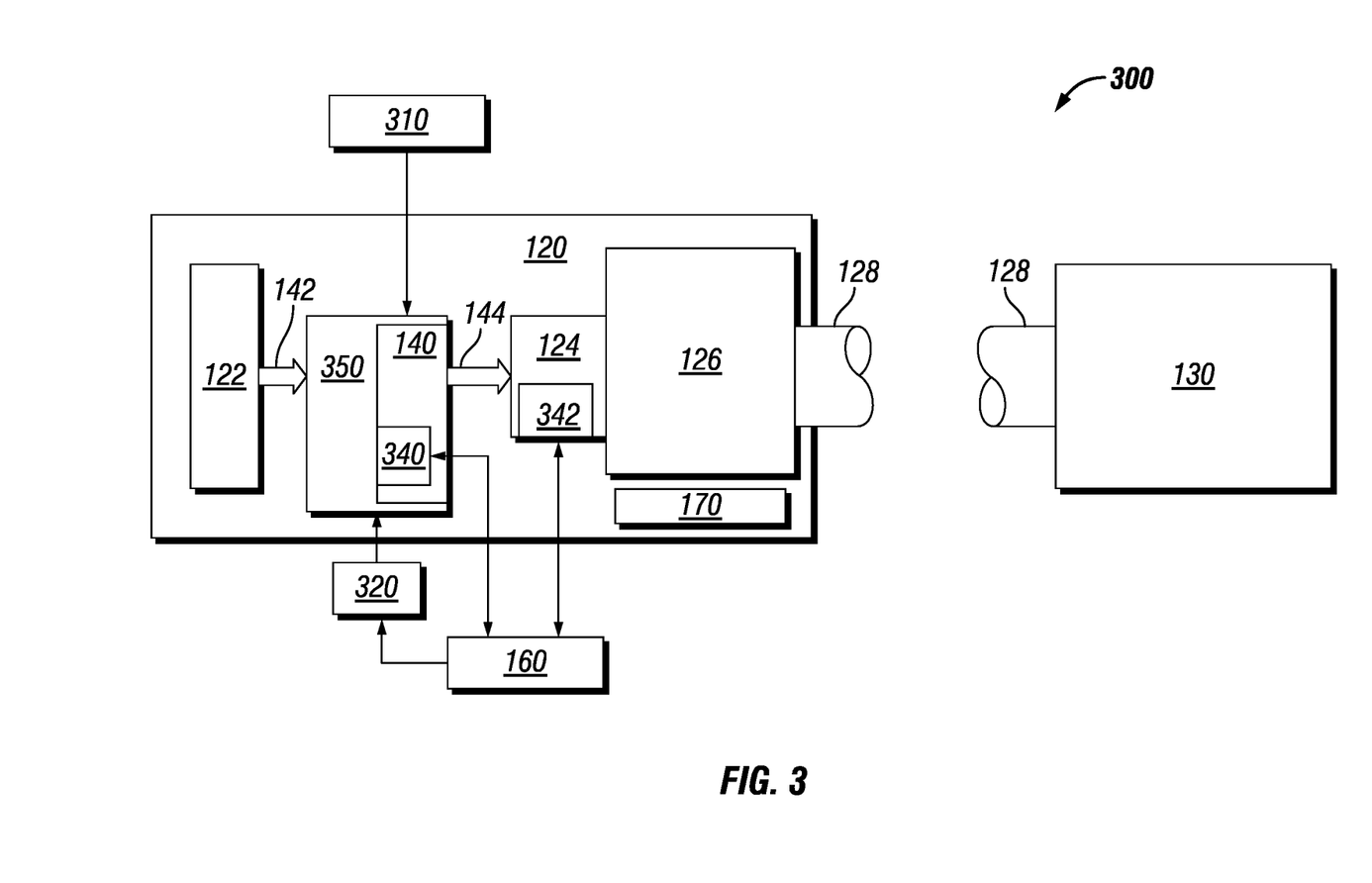
FIG. 3 is a schematic block diagram of a diffuser system to control a combustion mixture for a combustion engine system, in accordance with one or more aspects of the present disclosure.

FIG. 3 is a schematic block diagram of a diffuser system to control a combustion mixture for a combustion engine system, in accordance with one or more aspects of the present disclosure. In one or more embodiments, a diffuser system 300 comprises a diffuser 350 that may couple to the combustion chamber 124. A diffuser 350 may control addition of a material 320 to a fuel 310 to form a combustion mixture 140 to regulate combustion of the combustion engine 120. For example, diffuser 350 may mix fuel 310 with material 320 to form a combustion mixture 140 that ceases or stops combustion of the combustion engine 120 or limits combustion so as to place the combustion engine 120 in a spin-down operational mode. In one or more embodiments, material 320 may comprise an oxidizing material, combustible material or non-combustible material. In one or more embodiments, a combustible material of material 320 may comprise a gas (for example, methane or natural gas), a liquid (for example, diesel or gasoline) or a solid (for example, coal dust). In one or more embodiments, non-combustible material of material 320 may comprise a non-combustible gas (for example, argon, carbon dioxide, helium, neon, nitrogen or xenon), non-combustible liquid (for example water or Fluorinert™) or non-combustible solid (for example, an engineered extinguishing powder such as potassium bicarbonate or sodium bicarbonate, sand, cement or pumice). In one or more embodiments, an oxidizing material of material 320 may comprise oxygen or air. In one or more embodiments, material 320 comprises combustible material and is mixed with fuel 310 to form a combustion mixture 140 that is enriched such that the combustion mixture 140 is not combustible or is outside a combustible range. In one or more embodiments, material 320 comprises a non-combustible material and is mixed with fuel 310 to form a combustion mixture 140 that is diluted or diffused such that the combustion mixture 140 is not combustible or is outside a combustible range. In one or more embodiments, material 320 comprises an oxidizing material and is mixed with fuel 310 to dilute or diffuse the combustion mixture 140 such that the combustion mixture 140 is not combustible or is outside a combustible range.

A sensor 340 may be disposed in or about combustion mixture 140, diffuser 350 or any other suitable component of combustion engine 120 to provide a measurement associated with the combustion mixture 140. In one or more embodiments, sensor 340 is indirectly, directly, wirelessly or via a wired connection communicatively coupled to control panel 160. For example, one or more measurements from sensor 340 may be transmitted to a control panel 160. The material 320 may be adjusted manually or automatically based, at least in part, on the one or more measurements from the sensor 340. In one or more embodiments, a sensor 342 may be disposed within or about the combustion chamber 124 to provide one or more measurements associated with the combustion mixture 140 that flows into the combustion chamber 124. In one or more embodiments, a sensor 342 may be indirectly, directly, wirelessly or via a wired connection communicatively coupled to control panel 160. Control panel 160 may request one or more measurements from any one or more of sensors 340 and 342 or any other sensors or combination thereof at any one or more time intervals. In one or more embodiments, a diffuser 350 is disposed within control panel 160 such that control panel 160 controls the flow and amount of material 320 permitted to be mixed with fuel 310 and oxidizer to form the combustion mixture 140. In one or more embodiments, diffuser 350 may comprise one or more hardware components, software or both.

Figure 4:
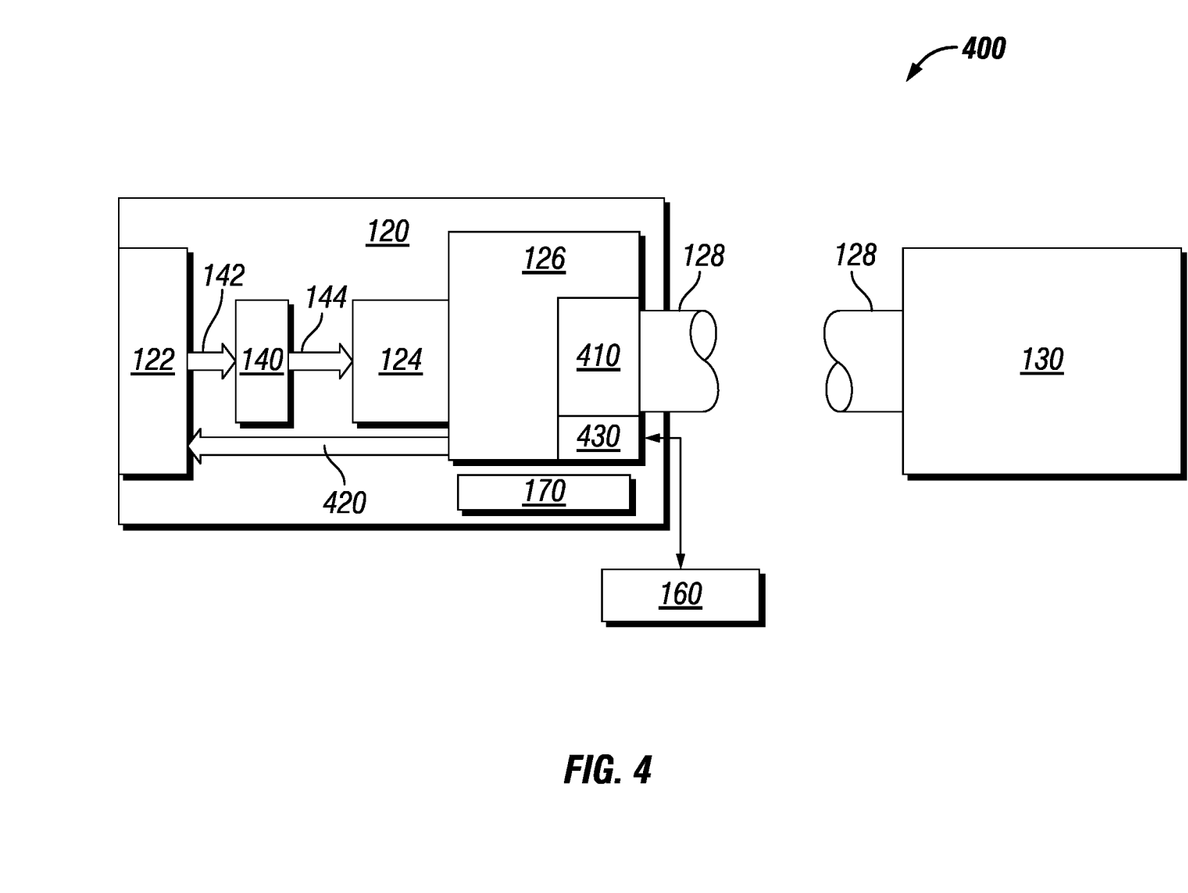
FIG. 4 is a schematic block diagram of a diffuser to control a combustion mixture for a combustion engine system, in accordance with one or more aspects of the present disclosure.

FIG. 4 is a schematic block diagram of a diffuser system to control a combustion mixture for a combustion engine system, in accordance with one or more aspects of the present disclosure. In one or more embodiments, a diffuser system 400 may comprise any one or more of an exhaust vent 126, an exhaust flow path 410, a return exhaust flow path 420 and a sensor 430. Exhaust flow path 410 may couple to return exhaust flow path 420. Return exhaust flow path 20 may couple to intake vent 122. Return exhaust flow path 420 may direct exhaust (or material from exhaust vent 126) from the combustion engine 120 to the intake vent 122. The exhaust from exhaust vent 126 dilutes or diffuses the oxidizer to fuel ratio of combustion mixture 140 to regulate the combustion of the combustion engine 120. In one or more embodiments return exhaust flow path 420 may comprise a tube, hose, line or any other device to couple the exhaust vent 126 to intake vent 122. In one or more embodiments exhaust flow path 420 may couple to any one or more components of combustion engine 120 to direct exhaust to a combustion mixture 140 to cease or restrict combustion in the combustion chamber 124.

In one or more embodiments, a sensor 430 is disposed within exhaust flow path 410 (as illustrated), exhaust vent 126 (not shown) or any other component of exhaust vent 126. Sensor 430 may communicate directly, indirectly, wireless or via a wired connection to control panel 160. In one or more embodiments, sensor 430 transmits one or more measurements associated with exhaust from exhaust vent 126 to control panel 160. Control panel 160 based, at least in part, on the one or more measurements may alter or adjust the amount of exhaust directed through return exhaust flow path 420. For example, combustion engine 120 may be in an operational mode that requires that combustion engine 120 being spin-down or shut-off. Control panel 160 may determine the amount of exhaust from exhaust vent 126 required to dilute or diffuse the combustion mixture 140 such that the combustion mixture 140 is not combustible in the combustion chamber 124. Exhaust flow path 410, exhaust vent 126, return exhaust path 420 or any other component of exhaust vent 126 or combination thereof may comprise a valve or control device that permits, restricts, or prevents exhaust from being directed to the intake vent 122 or any other component of combustion engine 120 and mixed with the combustion mixture 140. Diluting or diffusing the combustion mixture 140 with exhaust may maintain or place the combustion engine 120 in a spin-down or cease spinning operational mode.

In any one or more embodiments, a brake 170 may be engaged as discussed with respect to FIG. 1 to prevent a return to an undesirable or unwanted operational mode of the combustion engine 120.

Figure 5:
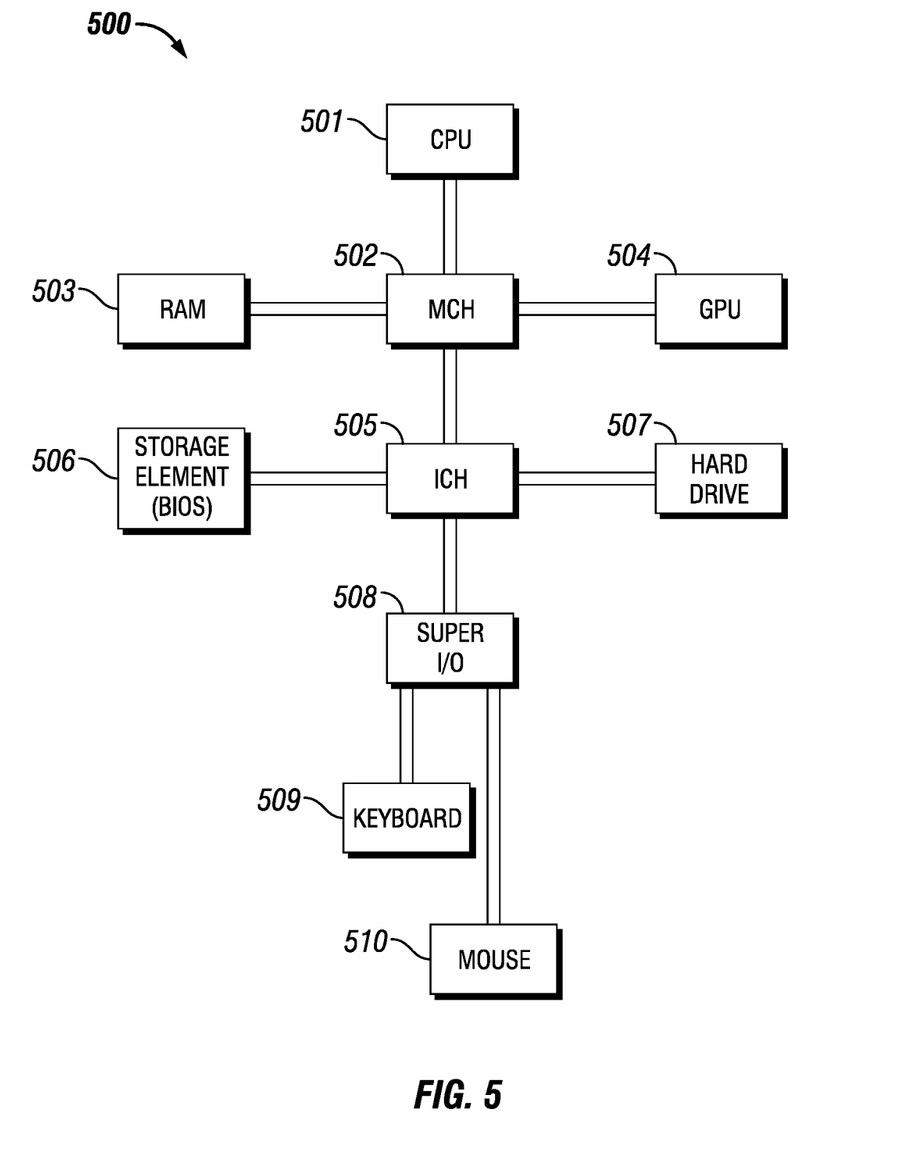
FIG. 5 is a diagram illustrating an example information handling system, in accordance with one or more aspects of the present disclosure.

FIG. 5 is a diagram illustrating an example information handling system, according to aspects of the present disclosure. The control panel 160 may take a form similar to the information handling system 500. A processor or central processing unit (CPU) 501 of the information handling system 500 is communicatively coupled to a memory controller hub or north bridge 502. The processor 501 may include, for example a microprocessor, microcontroller, digital signal processor (DSP), application specific integrated circuit (ASIC), or any other digital or analog circuitry configured to interpret and/or execute program instructions and/or process data. Processor 501 may be configured to interpret and/or execute program instructions or other data retrieved and stored in any memory such as memory 503 or hard drive 507. Program instructions or other data may constitute portions of a software or application for carrying out one or more methods described herein. Memory 503 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software program or application may be retrieved and stored in memory 503 for execution by processor 501.

Modifications, additions, or omissions may be made to FIG. 5 without departing from the scope of the present disclosure. For example, FIG. 5 shows a particular configuration of components of information handling system 500. However, any suitable configurations of components may be used. For example, components of information handling system 500 may be implemented either as physical or logical components. Furthermore, in some embodiments, functionality associated with components of information handling system 500 may be implemented in special purpose circuits or components. In other embodiments, functionality associated with components of information handling system 500 may be implemented in configurable general purpose circuit or components. For example, components of information handling system 500 may be implemented by configured computer program instructions.

Memory controller hub 502 may include a memory controller for directing information to or from various system memory components within the information handling system 500, such as memory 503, storage element 506, and hard drive 507. The memory controller hub 502 may be coupled to memory 503 and a graphics processing unit 504. Memory controller hub 502 may also be coupled to an I/O controller hub or south bridge 505. I/O hub 505 is coupled to storage elements of the information handling system 500, including a storage element 506, which may comprise a flash ROM that includes a basic input/output system (BIOS) of the computer system. I/O hub 505 is also coupled to the hard drive 507 of the information handling system 500. I/O hub 505 may also be coupled to a Super I/O chip 508, which is itself coupled to several of the I/O ports of the computer system, including keyboard 509 and mouse 510.

In one or more embodiments, a combustion engine system comprises a combustion engine, an intake vent disposed about the combustion engine, a control damper disposed about the intake vent, wherein the control damper controls oxidizer flow to the intake vent, and a combustion mixture, wherein the combustion mixture comprises a portion of oxidizer and a portion of fuel, wherein the portion of oxidizer is restricted by the control damper such that the combustion mixture is within a non-combustible range to maintain the combustion engine in a spin-down operational mode. In one or more embodiments, the combustion engine system further comprises a sensor disposed about the control damper, wherein the sensor transmits one or more measurements associated with oxidizer flow to the intake vent to a control panel. In one or more embodiments, the control panel is communicatively coupled to the control damper, and wherein the control panel adjusts a position of control damper based, at least in part, on the one or more measures associated with the oxidizer flow. In one or more embodiments, the combustion engine system further comprises a brake disposed about the combustion engine, wherein the brake prevents the combustion engine from transition to a spin-up operational mode. In one or more embodiments, the control damper comprises one of a butterfly-type valve, a knife-type valve or an iris-type valve. In one or more embodiments, the combustion engine comprises a turbine engine.

In one or more embodiments, a combustion engine system comprises a combustion engine and a diffuser disposed about the combustion engine, wherein the diffuser controls addition of a material to a combustion mixture to regulate combustion of the combustion engine. In one or more embodiments, the material comprises a combustible material, a non-combustible material, an oxidizer material, or an exhaust material. In one or more embodiments, the combustion engine system further comprises one or more sensors disposed about the combustion engine and a control panel communicatively coupled to the one or more sensors, wherein the control panel receives one or more measurements associated with at least one of the combustion mixture or the material from one or more sensors. In one or more embodiments, the combustion engine system further comprises a brake disposed about the combustion engine, wherein the brake prevents the combustion engine from transitioning to a spin-up operational mode. In one or more embodiments, the combustion engine system further comprises an exhaust vent disposed about the combustion engine, a return exhaust flow path coupled to the exhaust vent and the intake vent, wherein the return exhaust flow path directs the material from the exhaust vent to the intake vent. In one or more embodiments, the combustion engine comprises a turbine engine.

In one or more embodiments, a method for controlling a combustion engine system comprises controlling a combustion mixture of a combustion engine, wherein controlling the combustion mixture comprises regulating one or more of an oxidizer flow or a material that is mixed with the combustion mixture, placing the combustion engine in a spin-down operational mode by the regulation of the one or more of oxidizer flow or the material and maintaining the combustion engine in the spin-down operational mode. In one or more embodiments, the method further comprises restricting the oxidizer flow mixed in the combustion mixture such that the combustion mixture is outside a combustible range by positioning a control damper in a closed position or a partially closed position. In one or more embodiments, the method further comprises enriching the combustion mixture such that the combustion mixture is outside a combustible range by adding the material to the combustion mixture, wherein the material is a combustible material. In one or more embodiments, the method further comprises adjusting, by the diffuser, the combustion mixture such that the combustion mixture is outside a combustible range by adding the material to the combustion mixture, wherein the material is a non-combustible material. In one or more embodiments, the method further comprises adjusting, by the diffuser, the combustion mixture such that the combustion mixture is outside a combustible range by adding the material to the combustion mixture, wherein the material is an oxidizing material. In one or more embodiments, the method further comprises adjusting, by the diffuser, the combustion mixture such that the combustion mixture is outside a combustible range by adding the material to the combustion mixture, wherein the material is an exhaust material from an exhaust vent of the combustion engine, and wherein adjusting the combustion mixture comprises directing the exhaust from the exhaust vent to an intake vent of the combustion engine via a return exhaust flow path. In one or more embodiments, controlling the combustion mixture comprises receiving one or more measurements from one or more sensors, determining at least one of an amount of oxidizer or an amount of the material required to place the combustion engine in the spin-down operational mode and adjusting the combustion mixture based, at least in part, on the one or more measurements. In one or more embodiments, maintaining the combustion engine in the spin-down operational mode comprises engaging a brake to prevent the combustion engine from transition to a spin-up operational mode.

Although the present disclosure and its advantages have been described in detail, it should be understood that various changes, substitutions and alterations can be made herein without departing from the spirit and scope of the disclosure as defined by the following claims.

What is claimed is:

1. A combustion engine system, comprising:
   a combustion engine;
   an intake vent disposed about the combustion engine;
   a control damper disposed about the intake vent, wherein the control damper controls oxidizer flow to the intake vent; and
   a combustion mixture, wherein the combustion mixture comprises a portion of oxidizer and a portion of fuel, wherein the portion of oxidizer is restricted by the control damper such that the combustion mixture is within a non-combustible range to maintain the combustion engine in a spin-down operational mode.

2. The combustion engine system of claim 1, further comprising a sensor disposed about the control damper, wherein the sensor transmits one or more measurements associated with oxidizer flow to the intake vent to a control panel.

3. The combustion engine system of claim 2, wherein the control panel is communicatively coupled to the control damper, and wherein the control panel adjusts a position of control damper based, at least in part, on the one or more measures associated with the oxidizer flow.

4. The combustion engine system of claim 1, further comprising a brake disposed about the combustion engine, wherein the brake prevents the combustion engine from transition to a spin-up operational mode.

5. The combustion engine system of claim 1, wherein the control damper comprises one of a butterfly-type valve, a knife-type valve or an iris-type valve.

6. The combustion engine system of claim 1, wherein the combustion engine comprises a turbine engine.

7. A combustion engine system, comprising:
   a combustion engine; and
   a diffuser disposed about the combustion engine, wherein the diffuser controls addition of a material to a combustion mixture to regulate combustion of the combustion engine.

8. A combustion engine system of claim 7, wherein the material comprises a combustible material, a non-combustible material, an oxidizer material, or an exhaust material.

9. A combustion engine system of claim 7, further comprising:
   one or more sensors disposed about the combustion engine; and
   a control panel communicatively coupled to the one or more sensors, wherein the control panel receives one or more measurements associated with at least one of the combustion mixture or the material from one or more sensors.

10. A combustion engine system of claim 7, further comprising a brake disposed about the combustion engine, wherein the brake prevents the combustion engine from transitioning to a spin-up operational mode.

11. A combustion engine system of claim 7, further comprising:
    an exhaust vent disposed about the combustion engine;
    an intake vent disposed about the combustion engine; and a return exhaust flow path coupled to the exhaust vent and the intake vent, wherein the return exhaust flow path directs the material from the exhaust vent to the intake vent.

12. A combustion engine system of claim 7, wherein the combustion engine comprises a turbine engine.

13. A method for controlling a combustion engine system, comprising:
- controlling a combustion mixture of a combustion engine, wherein controlling the combustion mixture comprises regulating one or more of an oxidizer flow or a material that is mixed with the combustion mixture;
- adjusting, by a diffuser, the combustion mixture such that the combustion mixture is outside a combustible range by adding the material to the combustion mixture;
- placing the combustion engine in a spin-down operational mode by the regulation of the one or more of oxidizer flow or the material; and
- maintaining the combustion engine in the spin-down operational mode.

14. The method for controlling the combustion engine system of claim 13, further comprising restricting the oxidizer flow mixed in the combustion mixture such that the combustion mixture is outside a combustible range by positioning a control damper in a closed position or a partially closed position.

15. The method for controlling a combustion engine system of claim 13, further comprising enriching the combustion mixture such that the combustion mixture is outside a combustible range by adding the material to the combustion mixture, wherein the material is a combustible material.

16. The method for controlling a combustion engine system of claim 13, wherein the material is a non-combustible material.

17. The method for controlling a combustion engine system of claim 13, wherein the material is an oxidizing material.

18. The method for controlling a combustion engine system of claim 13, further comprising:
- wherein the material is an exhaust material from an exhaust vent of the combustion engine, and wherein adjusting the combustion mixture comprises:
- directing the exhaust from the exhaust vent to an intake vent of the combustion engine via a return exhaust flow path.

19. The method for controlling a combustion engine system of claim 13, wherein controlling the combustion mixture comprises:
- receiving one or more measurements from one or more sensors;
- determining at least one of an amount of oxidizer or an amount of the material required to place the combustion engine in the spin-down operational mode; and
- adjusting the combustion mixture based, at least in part, on the one or more measurements.

20. The method for controlling a combustion engine system of claim 13, wherein maintaining the combustion engine in the spin-down operational mode comprises engaging a brake to prevent the combustion engine from transition to a spin-up operational mode.

* * * * *